April 26, 1932.   H. H. McKEE   1,855,919
MEAT BRANDING
Filed Sept. 15, 1931

Harry H. McKee
INVENTOR

BY George W. Johns
ATTORNEY

Patented Apr. 26, 1932

1,855,919

UNITED STATES PATENT OFFICE

HARRY H. McKEE, OF CHICAGO, ILLINOIS, ASSIGNOR TO SWIFT AND COMPANY, OF CHICAGO, ILLINOIS, A CORPORATION OF ILLINOIS

MEAT BRANDING

Application filed September 15, 1931. Serial No. 562,978.

This invention relates to methods of branding meat products, especially such products as smoked joint meats which are conventionally encased in stockinette.

One of the objects of the present invention provides a method whereby such products may be branded upon the stockinette and upon the surface of the meat in one operation.

Another object of the present invention is to provide a meat product having identical brands upon the stockinette and upon the meat product. Other objects will be apparent from the description and claims which follow:

Referring now to the drawings.

The technique of the method of the present invention is simple. As is well konwn, elastic stockinette is a desirable wrapping material for joint meats. The objection to its use, however, in the case of high grade hams, for example, is the fact that it substantially conceals any brand marks or labels upon the product and does not of itself permit the ready attachment of the label. However, such products are quite commonly encased in stockinette before the smoking operation in order to secure a smooth, well shaped product after smoking. If the product is ink-branded while green, then encased in stockinette to be smoked, the stockinette casing effectually conceals the brand and it is consequently necessary to remove the stockinette before shipping to the trade, resulting in the loss of the stockinette as a protective covering. If the product is not ink-branded before smoking, it is necessary to remove the stockinette covering in order to brand or label the product, and here again the stockinette is necessarily discarded.

The present invention permits the proper branding of the product upon the surface of the meat or the skin thereon and the simultaneous branding of an identical indicia upon the stockinette, immediately superimposed above the mark upon the product, by one operation.

Figure 1:
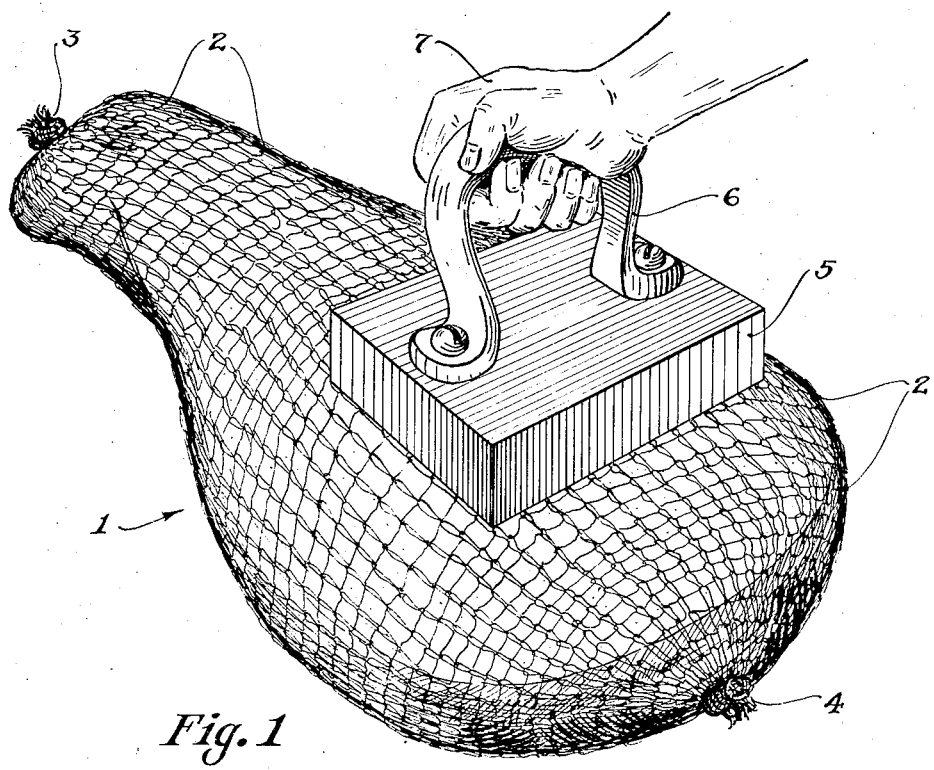
Figure 1 represents a ham encased in stockinette being imprinted with the brand.
Figure 2:
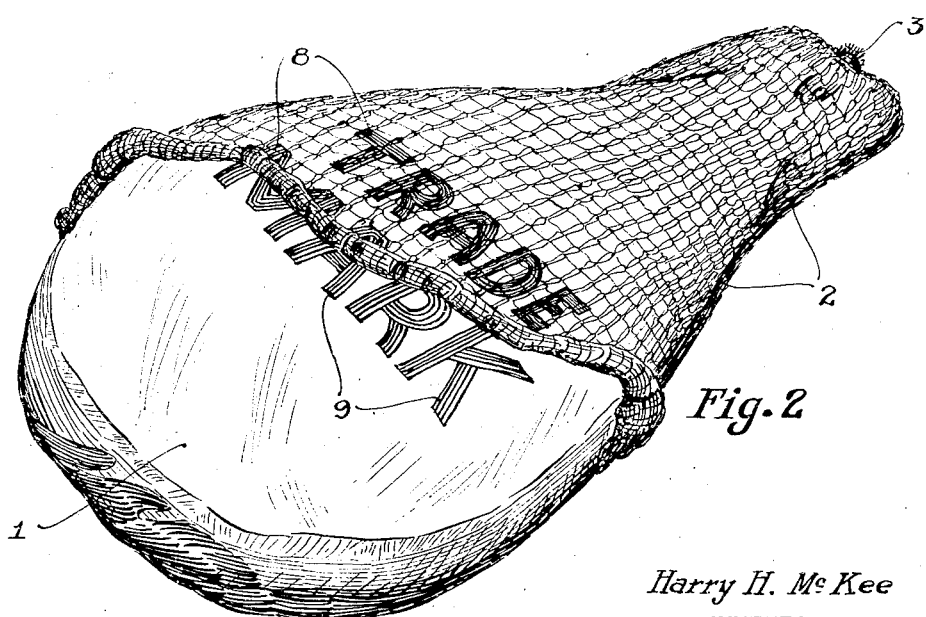
Figure 2 represents the ham of Figure 1 after branding with the stockinette rolled back showing the word "Trade" imprinted upon the stockinette and a portion of the word "Mark" imprinted upon the surface of the meat, a portion of the word "Mark" showing also on the unrolled portion of the stockinette.

In carrying out this invention, the ham 1 shown in Figure 1, for example, is encased in stockinette tubing 2 shown in the drawing as being tied at 3 and 4. A conventional branding iron 5 provided with handle 6 and marking indicia (not shown) on the branding face is grasped by the operator's hand 7, and the ink brand impressed upon the stockinette, resulting in the simultaneous impression of the brand 8 on the stockinette and the brand 9 upon the product, since sufficient ink readily passes through the stockinette to the surface of the product below.

In practicing this invention, a wide mesh stockinette is preferable and results in a very clear brand upon the stockinette and upon the product below, although other materials may be used.

It will be seen that the present invention permits the marketing of the product without removal of the protective stockinette covering in which it has been processed.

I claim:

1. The method of branding a meat product and the covering thereof which comprises placing upon the meat product absorbent open mesh fabric, such fabric being tightly stretched and in intimate contact with the surface of said meat product and thereafter impressing a brand upon the outer surface of said fabric such that a brand impression is made upon said fabric and a portion of the ink passes therethrough and makes an identical impression upon the surface of the product below.

2. The method of branding a meat product and the covering thereof, which comprises encasing the meat product prior to smoking in an elastic absorbent open mesh fabric envelope, said envelope being tightly stretched and in intimate contact with the surface of said meat product, and thereafter impressing a brand upon the outer surface of said fabric such that a brand impression is made upon said fabric and a portion of the ink passes therethrough and makes an identical impression upon the surface of the product below.

Signed at Chicago, in the county of Cook and State of Illinois, this 14th day of September, 1931.

HARRY H. McKEE.